United States Patent [19]
Reimers

[11] 3,865,630
[45] Feb. 11, 1975

[54] ELECTROCHEMICAL CELL HAVING HEAT PIPE MEANS FOR INCREASING ION MOBILITY IN THE ELECTROLYTE

[76] Inventor: Eberhart Reimers, 7700 Random Run La., No. 201, Falls Church, Va. 22042

[22] Filed: Nov. 20, 1972

[21] Appl. No.: 307,895

Related U.S. Application Data

[63] Continuation-in-part of Ser. No. 106,212, Jan. 13, 1971, abandoned.

[52] U.S. Cl. ............................... 136/86 A, 136/161
[51] Int. Cl. ..................... H01m 29/01, H01m 31/02
[58] Field of Search ....... 136/86 A, 86 R, 86 E, 161

[56] References Cited
UNITED STATES PATENTS 2,615,933  10/1952  Carlson et al. ...................... 136/161
3,231,426  1/1966  Ludwig et al. ..................... 136/86 R Primary Examiner—A. B. Curtis
Assistant Examiner—H. A. Feeley
Attorney, Agent, or Firm—Eugene E. Stevens III; Frank J. Dynda; Glenn S. Ovrevik

[57] ABSTRACT

A molten salt battery wherein is sunk through the battery case a heat pipe into the electrolyte for the purpose of heating the electrolyte. The heat pipe's low thermal time constant makes possible rapid temperature control of the electrolyte without regard to the heat sink effect of the battery case of electrodes.

6 Claims, 4 Drawing Figures

PATENTED FEB 11 1975
3,865,630
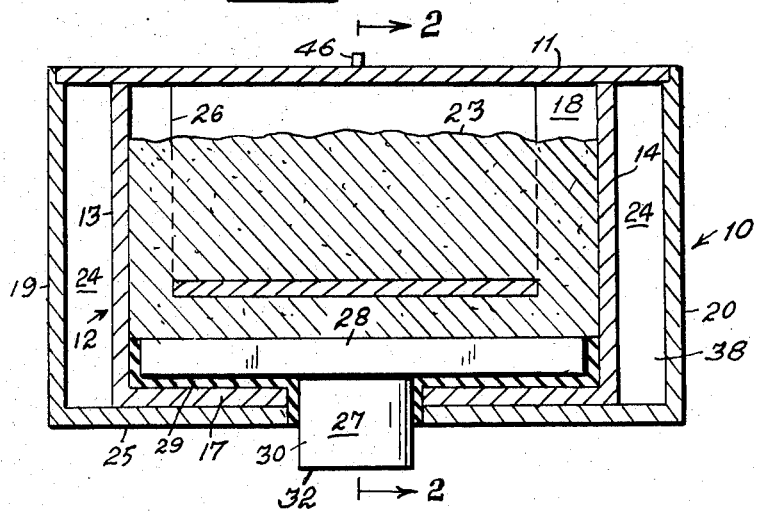
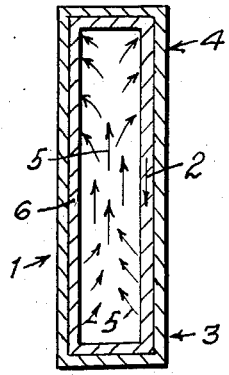
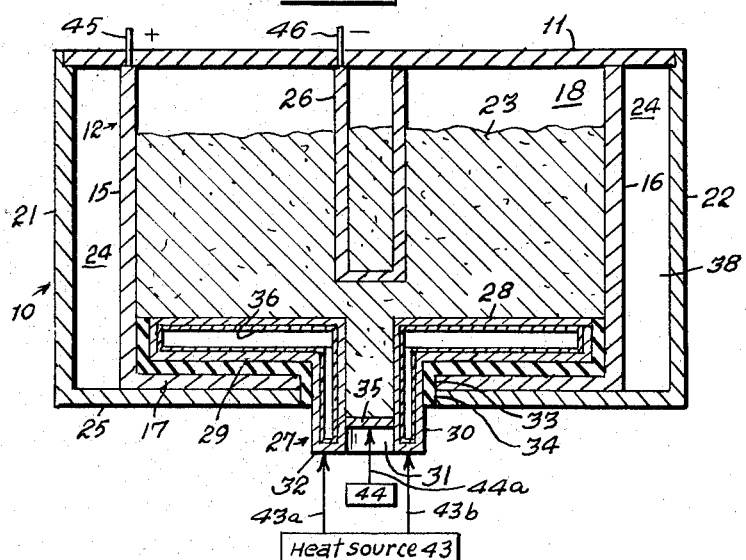
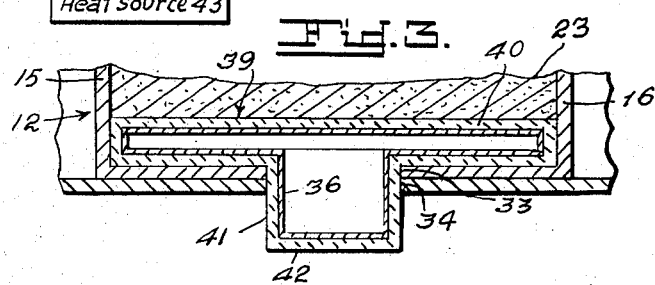
INVENTOR,
Eberhart Reimers
BY: Harry M. Saragovitz,
Edward J. Kelly &
Herbert Bell   ATTORNEYS 3,865,630

ELECTROCHEMICAL CELL HAVING HEAT PIPE MEANS FOR INCREASING ION MOBILITY IN THE ELECTROLYTE

CONTINUATION-IN-PART

This application is a continuation-in-part of my co-pending application, Ser. No. 106,212, filed Jan. 13, 1971, now abandoned, entitled "An Electrochemical Cell Having Heat Pipe Means for Increasing Ion Mobility in the Electrolyte."

GOVERNMENT USE

The invention described herein may be manufactured, used, and licensed by or for the Government for governmental purposes without the payment to me of any royalty thereon.

SUMMARY OF THE INVENTION

The invention relates to storage batteries and more particularly to the molten salt type battery requiring elevated temperatures and means to produce such temperatures in the battery to create ion mobility such that the electrolyte is sustained in its molten form.

In prior practice to make a molten salt type battery operational involved the time consuming and cumbersome manipulation of immersing the entire battery in an immersion heater or placing it within the confines of a hot water coil arrangement to obtain elevated temperature to create ion mobility such that the electrolyte is sustained in its molten form. The operating temperature of such a battery using lithium chloride as an electrolyte is 600°C. Molten salt batteries using sodium sulfur or lithium sulfur electrolyte have operating temperatures of 300° C and 400° C respectively. It will be appreciated that as various molten salt electrolytes are investigated, the normal operating temperature range, as presently recognized, may change.

It is an object of the invention to provide means integral with a molten salt type battery whereby the battery is quickly brought up to operating temperature.

Another object of the invention is a heat pipe integral with a molten salt type battery in intimate contact with the electrolyte.

A further object of the invention is a heat pipe integral with a molten salt type battery and in contact with the electrolyte therein in combination with means for sustaining the ion mobility after the battery has reached operating temperature.

The novel features that are considered characteristic of the invention are set forth with particularity in the appended claims. The invention itself, however, both as to its organization and method of operation as well as additional objects and advantages thereof will be best understood from the following description when read in connection with the accompanying drawings in the several figures of which like numerals identify like elements and in which:

FIG. 1 is a cross sectional view illustrating a preferred embodiment of the invention;

FIG. 2 is a cross sectional view taken along line 2—2 of FIG. 1;

FIG. 3 is a fragmentary view cross sectional view illustrating another embodiment of the invention; and FIG. 4 is a cross section view of a basic heat pipe.

DESCRIPTION OF A PREFERRED EMBODIMENT

To enhance the understanding of the invention, the following brief description of a basic heat pipe is submitted. Referring now to FIG. 4, a basic heat pipe as shown therein in the form of a closed evacuated hollow metal cylinder 1 lined with a capillary structure or wick 6 which is saturated with a volatile fluid 2. Reference numeral 3 indicates the evaporator section to which the heat is applied and 4 the condenser section from which the heat is removed. When heat is added to the evaporator section 3, fluid 2 volatizes and goes down the pipe as a vapor 5 to the condenser section 4 where it encounters a temperature lower than that of the evaporator section whereupon it returns to the wick in the form of a liquid, releasing the thermal energy in its heat of vaporization. The liquid or condensate returns to the evaporator section by capillary action. A more detailed explanation of the principles of the heat pipe is disclosed in an article entitled "The Heat Pipe," authored by K. Thomas Feldman, Jr. and Glen H. Whiting and published in the February 1967 edition of Mechanical Engineering, published by A.S.M.E.

In FIGS. 1 and 2 there is illustrated one form the unique molten salt battery of the invention may take wherein improved ion mobility is obtained. Reference numeral 10 indicates a stainless steel container or housing provided with a ceramic oxide or the like top 11 in sealed relationship therewith. A positive electrode 12 comprising a container fabricated from porous carbon consists of spaced vertical end walls 13 and 14 and spaced vertical side walls 15 and 16 contiguous with a bottom member 17 and extending to the top 11 forming therewith in sealed relationship a chamber 18 in which is contained the lithium chloride electrolyte 23 which in part either solidifies at cold temperatures or contains a high concentration of salt adjacent the bottom of chamber 18 whereby ion mobility is impaired. The positive electrode 12 is positioned in housing 10 so that its vertical walls are spaced from the vertical walls 19–22 of housing 10 and form therewith a chamber 24 in which is contained the chlorine gas 38 of the battery. Electrode 12 is maintained in this position by having its bottom member 17 affixed to the inside surface of the bottom 25 of housing 10 by means well known in the art. Depending from the top 11 and affixed thereto also by means well known in the art is the negative electrode 26 which extends into the lithium chloride electrolyte and is symmetrically positioned in chamber 18 with respect to the vertical walls of the positive electrode 12 but not in direct contact therewith. The negative electrode 26 comprises a lithium wick consisting of a porous stainless steel fiber-metal wick to contain and trasport liquid lithium by capillary action. Reference numeral 27 generally indicates a heat pipe designed and operative in accordance with the principles as described above. The evaporator end 28 is in direct contact with electrolyte 23 and in the instant embodiment is rectangular in shape and extends the length and width of chamber 18 formed by electrode 12 along the bottom thereof except for insulation means 29 which electrically insulates the heat pipe 27 from carbon electrode 12 and housing 10. The heat pipe 27 consists of a hollow cylindrical member 30 formed to produce a central bore 31 and having a box-like member joined at one end thereof and forming a condenser section 28 therefor with the opposite end thereof closed providing an evaporator section 32. It being understood that the heat pipe 27 thus described is provided with a wick member 36 covering the entire interior surface thereof and saturated with a volatile liquid. The wick member may consist of material such as woven cloth or fiberglass and the volatile liquid may be any liquid having an appropriate vaporization (boiling) temperature which is suitable for use in heat pipe applications. That is, the boiling temperature at a determined pressure must be at or slightly above the intended operational temperature of the battery electrolyte and the liquid must be of a variety which readily recombines in the course of the heat pipe cycle. For example, in the higher temperature electrolyte embodiment (lithium chloride), the heat pipe volatile fluid might be cesium ($C_s$) which typically vaporizes at 600° C at 400 mm pressure, sodium ($N_a$) which typically vaporizes at 600° C at 30 mm pressure or potassium (K) which typically vaporizes at 600° C at 180 mm pressure. Likewise, in the lower temperature electrolyte embodiment (Sodium Sulfur), the heat pipe volatile fluid might be cesium ($C_s$) which vaporizes at 300° C at 1 mm pressure, mercury ($H_g$) which vaporizes at 300° C at 250 mm pressure, potassium (K) which vaporizes at 300° C at 1 mm pressure or glycerin (glycerol) which vaporizes at 300° C at near atmospheric pressure (approximately 690mm).

It will be appreciated that the heat pipe volatile liquid may be selected from a wide variety of elemental materials and/or compositions thereof as the requisite vaporization temperature of the volatile liquid is variable by changing the pressure condition within the heat pipe. Among the many recognized heat pipe volatile liquids which may be utilized, dependent upon the operational temperature of the electrolyte, are water, glycerine, acetone, ammonia water, or molten salts. Obviously, when pressure requirements to obtain a desired vaporization temperature are excessive, heat pipe wall thickness may reduce thermal transfer efficiency. Thus, the most appropriate volatile fluid in a given molten salt battery would be one having a vaporization temperature near the electrolyte operational temperature at atmospheric pressure.

The cylindrical member 30 affixed in aperatures 33 and 34, in sealed relationship, in the bottom 17 of carbon electrode 12 and the bottom 25 of housing 10, respectively, with insulation 27 therebetween, in such a manner that the evaporator section 32 is maintained externally of housing 10 and the condenser section 28 at the bottom of chamber 18. A baffle plate 35 is provided in the central bore 31 wherein some of the electrolyte accumulates for a purpose subsequently described.

In practice, considering the embodiment disclosed in FIGS. 1 and 2, the battery is made operational by applying heat from a heat source 43 to the evaporator section 32 as indicated by arrows 43a and 43b. The heat source 43 may be either electrical or steam. The heat thus applied to the evaporator or end 32 causes the volatile liquid in wick 36 to evaporate from wick 36 and also increases the vapor pressure at the evaporator. As a result the vapor moves along the interior of the heat pipe towards the condenser section 28 where it is released to the lithium chloride electrolyte to create ion mobility therein such that the electrolyte is sustained in a molten form. When the heat is removed from the evaporator section, the vapor condenses and returns to the wick and hence the condensate via capillary action returns to the evaporator. It has been found that after the heat source 43 has been removed from evaporation section 32 and particularly while current is being delivered to a load by the battery that solidification of the electrolyte adjacent the evaporator section 28 and in bore 31 occurs with the resultant reduction in potential difference between the battery terminals 45 and 46. To inhibit such solidification during the operating period of the battery, a baffle plate 35 is provided in bore 31 as aforedescribed and to which is applied a secondary heat source 44 as indicated by arrow 44a whereby such solidification is inhibited and the electrolyte is sustained in its molten form during said operating period.

Another embodiment of the invention is shown in the fragmentary view, FIG. 3, wherein 39 generally indicates a ceramic heat pipe comprising an assembly consisting of box-like member 40 forming the condenser section which is fixed in chamber 18 of porous carbon electrode 12 in direct contact with the interior surface of the bottom thereof and a hollow cylindrical section 41 having one end joined and in communication with the box-like section and extending through perforations 33 and 34 of the carbon electrode 12 and battery housing 10, respectively, in sealed relationship thereto, to the exterior of said housing where it is closed to form an evaporator section 42. This assembly is also evacuated and has its interior surfaces lined with a wick member 36 which is saturated with a volatile liquid as aforedescribed. In this embodiment, it is not necessary to provide electrical insulation between the heat pipe and the carbon electrode and steel housing.

I claim:

1. An improved molten salt type electrochemical cell wherein the ion mobility of the electrolyte thereof is greatly increased, comprising in combination:

an electrochemical cell housing having top, bottom, and side members;

a first electrode consisting of a fuel gas permeable cup shaped member having the bottom portion thereof affixed to the interior surface of said bottom member of said housing and its wall portion extending to and affixed in sealed relationship to said top member of said housing and adapted to provide a fuel gas chamber which encompasses the wall portion of said cup shaped member;

a molten salt electrolyte contained within said fuel gas permeable cup shaped member, said electrolyte having a significant temperature responsive ion mobility characteristic and a predetermined operational temperature range;

a consumable second electrode comprising a porous fibermetal wick structure adapted for molten salt electrolyte capillary action and disposed within said electrolyte, said second electrode being electrically isolated from said first electrode;

an electrochemically reactive fuel gas in said fuel gas chamber, said fuel gas compatible with said molten salt electrolyte and with said first and said second electrodes; and heat transfer means spaced from said bottom portion of said fuel gas permeable cup shaped member and in contact with said electrolyte in said cup shaped member wherein said heat transfer means is a heat pipe having a selected vapor cycle, said heat pipe consisting of a closed evacuated chamber having inside wall surfaces lined with a capillary structure saturated with a volatile fluid, wherein said evacuated chamber defines an evaporator section at one end thereof and a condenser section at the other end thereof, said evaporator section end thereof is adapted for thermal energization by an external heat source, and said condenser section thereof is disposed in direct heat conductive relation with said electrolyte which is heated by said heat transfer means, said heat pipe of said heat transfer means having a selected internal pressure condition and said volatile fluid having a vaporization temperature within said operational temperature range of said molten salt electrolyte at said selected internal pressure.

2. The invention in accordance with claim 1 wherein said heat pipe consists of an elongated cylindrical chamber with a hollow flanged end section which essentially constitutes said condenser section of said chamber.

3. The invention in accordance with claim 2 wherein said heat pipe cylindrical chamber has a metallic outer wall surface and said heat pipe is electrically isolated from said second electrode.

4. The invention in accordance with claim 2 where said heat pipe cylindrical chamber has a ceramic outer wall surface and said heat pipe is electrically isolated from said chamber.

5. The invention in accordance with claim 2 wherein said cylindrical chamber has a hollow center section which is terminated at said evaporator section end thereof to contain said electrolyte; and said terminated center section is adapted for thermal energization of said electrolyte contained therein by an external heat source.

6. The invention in accordance with claim 5 wherein said evaporator section end of said chamber and said terminated center section are adapted for energization by separate external heat sources.

* * * * *